United States Patent [19]

Shimizu et al.

[11] 4,313,832
[45] Feb. 2, 1982

[54] METHOD FOR TREATMENT OF AQUEOUS SOLUTIONS WITH ION EXCHANGE FIBERS

[75] Inventors: Hiroshi Shimizu, Tokyo; Toshiyuki Daigo, Kashiwa; Hideo Azuma, Kasukabe, all of Japan

[73] Assignee: Rohm and Haas Company, Philadelphia, Pa.

[21] Appl. No.: 158,971

[22] Filed: Jun. 12, 1980

[51] Int. Cl.³ .................. B01D 37/02; B01D 15/04
[52] U.S. Cl. ............................ 210/663; 210/777; 210/502; 210/505
[58] Field of Search ............ 210/683, 686, 777, 778, 210/502, 505, 508, 663, 681, 685, 793, 794, 798, 806; 521/29

[56] References Cited

U.S. PATENT DOCUMENTS

| | | | |
|---|---|---|---|
| 2,596,392 | 5/1952 | Fessler | 210/777 |
| 3,674,686 | 7/1972 | Brimmer et al. | 210/778 |
| 3,880,754 | 4/1975 | Brost | 210/777 |
| 3,944,485 | 3/1976 | Rembaum et al. | 521/29 |
| 4,007,301 | 2/1977 | Martino | 210/778 |
| 4,177,142 | 12/1979 | Halbfoster | 210/505 |
| 4,190,532 | 2/1980 | Halbfoster | 210/508 |

Primary Examiner—Ivars C. Cintins

[57] ABSTRACT

Ion exchange fibers having a thickness of about 2–200 micrometers and a length more than twice the thickness are mixed as a slurry of cation, anion or mixed cation and anion exchange fibers, with or without powdered ion exchange resin of 2–250 micrometers diameter, to intertwine the fibers and immobilize any powdered resin present; the resins are coated from the slurry as a mat on to a filter support; liquids to be purified are passed through the mat until the ion exchange materials are exhausted; and the exhausted mat is stripped from the filter support by a backwash of liquid, gas or both.

17 Claims, 8 Drawing Figures

METHOD FOR TREATMENT OF AQUEOUS SOLUTIONS WITH ION EXCHANGE FIBERS

The present invention concerns a method for purifying aqueous solutions by the use of ion exchange fibers. More particularly it concerns the removal of both particulate and ionic impurities from aqueous solutions by passing the solutions through a mat of intertwined ion exchange fibers having a thickness from about 2 to about 200 micrometers and a length of at least twice the thickness, the mat optionally containing powdered ion exchange resin from about 2 to about 250 micrometers diameter, and including process steps for forming the mat on, and removing it from, a filter support.

Electric power generating facilities, and particularly atomic power plants, require treatment of both feed water and waste water to remove ionic impurities, colloidal and large particulate impurities. An electrical conductivity of not more than 50 µmhos/cm and relatively low ionic concentration is currently a reasonable goal for such aqueous streams. Treatment of these aqueous streams has heretofore been performed by methods combining ordinary packed beds of bead-type ion-exchange materials and the technique of reverse osmosis or ultrafiltration, or filtration through a filter element coated with a mixture of finely powdered cation and anion exchange resins.

Since the former combination requires complex and expensive equipment, the latter method of simultaneous filtration and ion exchange through an ion exchange filter element has come into wide usage. This simultaneous ion exchange and filtration method, however, suffers from the following disadvantages:

The first disadvantage is that filter precoats of finely powdered ion-exchange resin often crack during water treatment. These cracks often degrade filter performance to the point that the quality of the treated water is affected. These precoat layers are formed from finely powdered resins which are produced by pulverizing large (0.2 mm to 0.6 mm diameter) ion-exchange resin beads, and the resulting powder contributes little strength to the precoat layer.

The second disadvantage is that a coarse-mesh filter support allows loose particles of the powdered ion-exchange resin to pass through and contaminate the filtrate, while a fine-mesh support causes a higher initial pressure drop across the filter, and this pressure drop increases as the loose resin particles clog the support. The clogging of the filter support with such particles and other extraneous matter may at times be so serious that the support may not easily be cleaned, and therefore may not be re-used without expensive reconditioning. Especially in a nuclear power generating plant, radioactive waste in the effluent streams is a serious problem, and ion-exchange resin particles bearing radioactive ions seriously contaminate the waste streams when they break through the filters. For example, a mixture of finely powdered cation and anion exchange resins having particle diameters of about 40 µm, coated as a precoat layer on a stainless steel gauze of 40–70 µm mesh size sloughs particles which pass through the mesh of the stainless steel gauze and into the filtrate, contributing radioactivity to the effluent stream. If a stainless steel gauze with mesh size smaller than about 20 µm is used to avoid passage of sloughed particles, then the pressure drop across the filter increases abruptly and the sloughed particles clog the openings of the gauze to still further increase pressure drop to an impractical level. If larger ion exchange resin particles are used to avoid the above difficulties, the purity of the filtrate is noticeably degraded, and the precoat layer is even more apt to break despite the reduced pressure drop.

The third disadvantage is that since the finely powdered ion exchange resin is generally produced by pulverizing larger ion-exchange beads, the powder contains a wide range of particle sizes including extremely small particles, and the larger particles may be cracked or stressed so that they break into smaller particles upon exposure to compaction, swelling and contraction involved in the process of liquid treatment, and these various, extremely small particles either pass through the filter support to contaminate the filtrate, or clog the filter support.

An aim of the present invention is to provide a novel method for the treatment of aqueous solutions which avoids any of the various disadvantages, such as those described above, of conventional methods.

The method of the present invention comprises four steps:

(a) Mixing ion-exchange fibers having a thickness in the range of from about 2 to about 200 µm and a length of more than twice the thickness, to intertwine the fibers into a compact mass, (b) converting the compact mass of fibers into a slurry with water and applying the slurry to a filter support, to form a precoat layer thereon, (c) passing an impure aqueous liquid through the precoat layer to remove ionic impurities, colloidal impurities and suspended particulate impurities from the aqueous liquid, and (d) subsequent to removal of impurities from the aqueous liquid, backwashing the filter support with a gas or liquid or mixed gas and liquid, to remove the precoat layer containing the removed impurities.

In the first step above, the ion-exchange fibers may be cation-exchange fibers, anion-exchange fibers, or a mixture of cation and anion exchange fibers, and the intertwined fibers may optionally entrain finely divided ion-exchange resin particles of a diameter from about 2 to about 250 µm.

FIG. 1 shows particles of ion exchange resin all bearing the same charge, i.e. all anion or all cation exchange functionality; the figure illustrates that the resin is dispersed as discrete particles, containing cracks and extremely fine particles which tend to adhere to the larger particles.

FIG. 2 shows particles of mixed cation and anion exchange resins; the weak attraction of the oppositely charged particles causes them to tend to agglomerate loosely together. Cracks and particles of extremely small size are still present.

Figure 1:
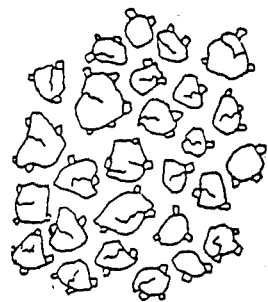
FIGS. 1 and 2 represent typical, conventional precoating materials suspended in water.
Figure 2:
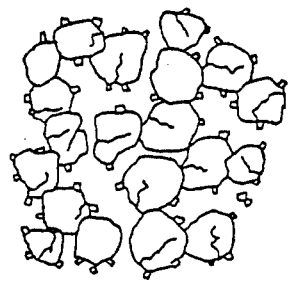
Figure 3:
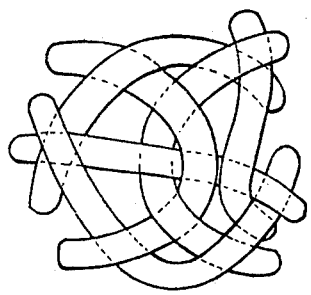
FIG. 3 shows the intertwining of ion exchange fibers having a circular cross section and bearing either the same or opposite ionic charges; it may be seen that no cracks or extremely small particles are present.
Figure 4:
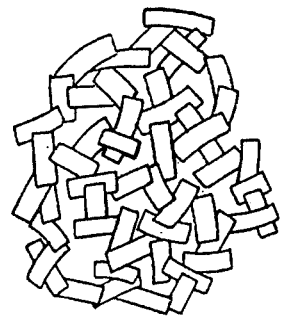
FIG. 4 shows intertwining of short ion exchange fibers having a rectangular cross section and bearing either the same or different ionic charges; again no cracks or extremely small particles are present.
Figure 5:
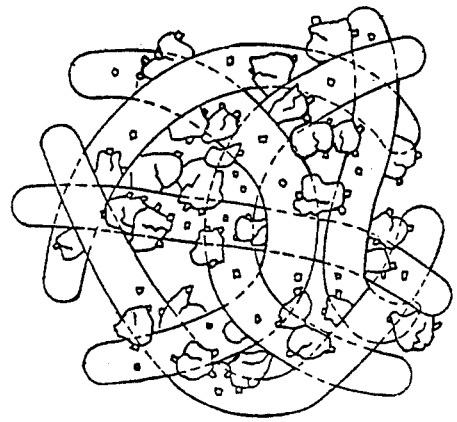

FIG. 5 shows an intertwined mass of ion exchange fibers having either the same or opposite ionic charges in which finely divided ion exchange resin particles are retained. This figure represents equally well finely divided ion exchange resins bearing a single type of functionality, either anion or cation, or mixed anionic and cationic finely divided resins, and the intertwined mass in which the finely divided resins bear the same or opposite ionic charges to that of the fibers, and the intertwined mass in which either the fibers, the finely divided particles or both are mixed cationic and anionic resins.

Figure 6:
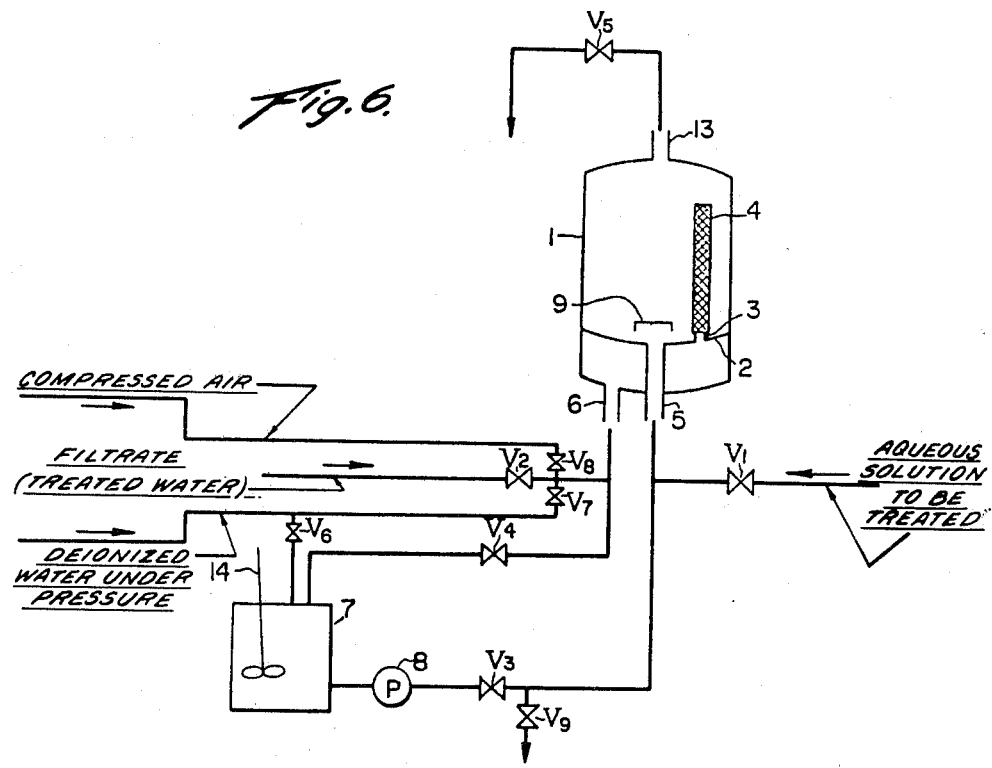
Figure 8:
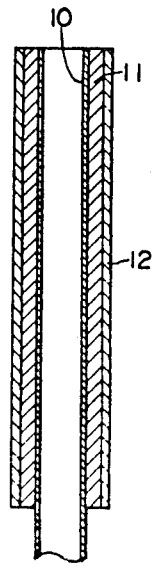
Figure 7:
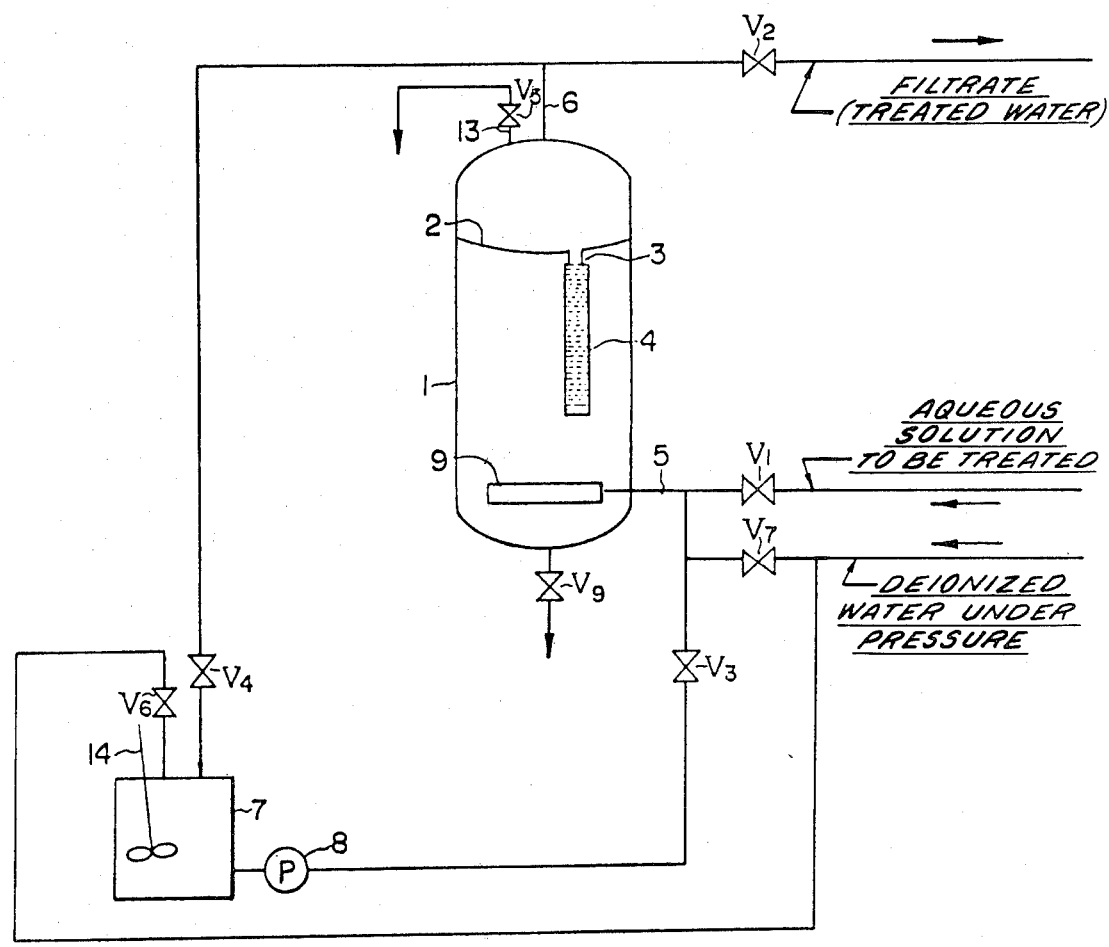

Various kinds of apparatus to be used for the treatment of aqueous solution in accordance with the method of the present invention are illustrated in FIGS. 6–8.

FIG. 6 illustrates an apparatus which utilizes an external source of compressed air to separate the spent filter medium from the filter support, while FIG. 7 illustrates an apparatus which utilizes air compressed within the filter vessel by a source of pressurized, deionized water to separate the spent filter medium from its suports.

FIG. 8 illustrates the construction of a typical filter element used in the method of the present invention. Each filter element comprises a filter support, 11, which is formed by wrapping a stainless steel gauze around or winding a nylon or polypropylene cord on, the outer surface of a perforated, stainless steel plate, 10. The filter layer, 12, of ion exchange fibers, with or without finely divided ion exchange material, is formed on the outer surface of this filter element.

The method of the present invention avoids the difficulties of conventional processes described above, and enjoys a number of advantages over previously known processes.

One advantage of the present invention is that the filter layer does not readily crack. This property results from the interwining of the fibers in the precoat layer, which imparts a significant cohesive strength to the layer. As a result, the filter element remains intact during liquid treatment, the filter support avoids clogging by particulate impurities in the liquid, and the filtrate is not contaminated by liquid which has passed untreated through cracks in the precoat layer.

Another advantage is that sloughing of particles from the precoat layer is minimized, and consequently clogging of the filter support, increase of pressure drop during filtration, and contamination of the filtrate by particles of the precoat layer are all minimized. The ion exchange fibers themselves are significantly more resistant to breakage during the packing, swelling, and shrinking envolved in liquid treatment, so that a precoat layer of the intertwined fibers alone is unlikely to produce small particles, and the fiber mat is so effective in immobilizing small particles, which may deliberately be entrained in the precoat layer, that particle sloughage is almost eliminated.

Yet another advantage lies in the ease with which the process steps of the present invention may be carried out. A uniform filter precoat layer may easily be formed from the fiber slurry, and the spent filter layer may easily be separated from the filter support. As described above the process steps of mixing the fibers to cause them to intertwine, slurrying the intertwined mass of fibers, and applying the fibers as a precoat to the filter support produces a tenacious, reticular filter layer of the intertwined fibers which possesses a high degree of physical integrity. Subsequent backwashing of the filter support with a gas or liquid tends to cause the entire filter layer to separate from the filter support as a single unbroken piece or a few large pieces.

Yet another advantage to the method of this invention lies in the ease with which a multi-ply filter layer may be formed on the filter support by initially precoating it with large ion-exchange fibers, and subsequently applying layers of smaller fibers to the initial mat. In this way the method of the present invention enjoys great freedom in the selection of filter supports and filter mesh sizes.

Yet another advantage of this process is that the filter effectively removes ions, colloidal substances and suspended solid substances from aqueous liquid under treatment to produce a high-purity filtrate at a high flowrate for extended periods. Ion exchange occurs at the active ion-exchange sites of the fibers and of the resin microparticles, if present, collidal substances are either coagulated or physically trapped by the precoat layer, and suspended solid substances are trapped by the layer. Because of the high physical stability of the precoat layer and its freedom from particle sloughage, the filter gives long service in the production of high-purity liquid.

The cation and anion exchange fibers and the finely divided ion-exchange resins used in the process of the present invention include those made of the styrene divinylbenzene or acrylic materials which form the polymers which conventional ion-exchange resins are prepared. The ion-exchange groups to be incorporated in the ion-exchanging fibers include sulfonic acid, carboxylic acid, trimethylammonium and other quaternary ammonium groups, primary, secondary or tertiary amine groups, and other ion-exchange functional groups which would be readily apparent to one skilled in the art. In order to maximize both ion-exchange capacity and the electrostatic interaction of the cation and anion exchange fibers and finely divided ion-exchange resin, however, it is preferred to select strongly acidic and strongly basic ion-exchange functional groups. The ionic form of ion-exchange groups may be varied according to processes well known in the art, to suit the nature of the aqueous solution under treatment or the purpose of the treatment.

The ion-exchange fibers which may be employed in the present invention include both straight fibers and crimped fibers. The cross section of these fibers may include round, elliptical, dumbbell, square, star, or ring shapes. As indicated above, these fibers have a thickness in the range of from about 2 to about 200 $\mu$m; fine ion-exchange fibers having a thickness of from about 2 to about 30 $\mu$m are preferred because they provide rapid ion-exchange kinetics and permit efficient removal of colloidal and suspended solid substances. Ion-exchange fibers having a greater thickness are used advantageously to form base filter layers directly on the filter support in the construction of multi-ply filter layers. Fibers used in the invention have a length of more than twice the thickness; ion-exchange fibers of a slender shape, having a length of from about 5 to about 50 times the thickness, are preferred because they are more readily intertwined, they form a more uniform precoat layer, they form a more cohesive layer, and the resulting layer is more easily removed from the filter support after use.

The finely divided ion-exchange resins which may be entrained by the intertwined fibers may be obtained by pulverizing conventional ion-exchange beads, by suspension popolymerizing an ion-exchange resin in a manner that results in very small resin particles, or by using emulsion polymerized ion-exchange resins such as those disclosed in copending U.S. patent applications, Ser. No. 943,889 or 944,052. The individual particles of the finally divided ion-exchange resin may be in any of various shapes including the irregular shapes that result from crushing and grinding spherical, elliptical and dumbbell shapes. The finely divided resin useful for entraining by the intertwined fibers has a particle diameter from about 2 to about 250 μm, and preferably from about 2 to about 50 μm, the smaller particles having a more rapid kinetic equilibrium, greater effectiveness in removing colloidal substances and suspended solid substances, a greater uniformity when entrained in the fibers, more thorough entrainment, and the ability to form a physically more stable filter layer.

The method of the present invention involves a step of mixing ion-exchange fibers, and optionally finely divided particles of ion-exchange resin, to produce a physically and electrostatically intertwined mass of fibers and resin prior to the step of applying the filter precoat layer. This step is very important to the production of a cohesive and uniform precoat filter layer. Intertwining of the fibers may be achieved by thoroughly stirring and blending the fibers in water, optionally in the presence of the finely divided resin particles. As an example, the fibers may be mixed and blended in a mixing device operating at a speed of from 100 to 300 rpm.

As the fibers are mixed, two different interactions occur which bind the ion-exchange materials together in a mass. The fibers themselves are physically entangled, forming a dense network which traps any finely divided resin particles that are present, and particularly in the case of a mixture of cation and anion exchange fibers, electrostatic attraction further binds the fibers together. Where finely divided ion-exchange resin particles are present, electrostatic attraction also binds these to fibers of the opposite charge, and to other particles of the opposite charge. To promote this electrostatic binding, it is preferable to carry out this mixing step while the ion-exchange materials are wet with water. This wetting may occur prior to, or during mixing.

The ratio of cation to anion exchange fibers and finely divided cation to anion exchange resin particles is selected on the basis of various factors such as the purpose of the liquid treatment, the ion-exchange capacities of the ion-exchange materials used, the concentration of ions in the treated liquid, colloidal substances and suspended solid substances which are to be removed from the treated liquid, and the cohesiveness and uniformity of the ion-exchange fiber mat. Cation and anion exchange fibers are mixed in a ratio of from about 10:1 (cation:anion) to 1:10, and more preferably in a ratio of from about 4:1 to 1:4, by weight on a dry basis. Ratios greater than 10:1 or smaller than 1:10 are regarded for practical purposes as all cation and all anion fibers, respectively. When finely divided ion-exchange resin is included in the mixture, the ion-exchange fibers comprise not less than 10%, by weight, of the total ion-exchange material, and preferably from about 30% to about 80% of the total weight of ion-exchange material, on a dry basis. In a mixture of ion-exchange fibers and finely divided ion-exchange resin, in which cation and anion exchange materials are mixed, the ratio of total cation exchangers to total anion exchangers is from about 10:1 to about 1:10, and preferably from about 3:1 to about 1:3, by weight on a dry basis.

The filter layer, or precoat layer, is formed according to the process of the present invention by slurrying the intertwined mass of fibers and optional ion-exchange resin, and applying the slurry as a uniform coating on the filter support. The thickness of the filter layer thus formed is from about 2 to about 20 mm, and preferably from about 5 to about 10 mm. In a multi-ply filter layer, the undercoat consists solely of ion-exchange fibers deposited directly on the surface of the filter support, while the overcoat layers comprise the ion-exchange resin. As described above, the undercoat is first applied as a slurry to the filter support, and the overcoat layers are subsequently applied as slurries of the desired fibers and optional, finely divided ion-exchange resin.

Examples of filter supports upon which the filter layer may be deposited in the practice of the present invention include cylindrical filters with slits having a width of about 20 to about 100 μm, porous carbon filter cylinders, porous cylindrical filters made of nylon or polypropylene yarns wound to a thickness of about 10 to about 15 mm, cylindrical filters formed of stainless steel gauze with mesh sizes from about 20 to about 100 mesh, and filter screens and filter plates from filter presses. In other words, any of the filter supports commonly used for conventional precoat filtration and/or ion-exchange filtration with finely divided ion-exchange resins may be used in practicing the method of the present invention.

The treatment step involves applying pressure to the aqueous liquid to be treated, causing it to pass through the filter layer formed of the intertwined mass of ion-exchange resin, undesirable ions being exchanged for desirable ions during contact of the liquid with the ion-exchange materials. Colloidal substances, such as colloidal iron and colloidal silica, are removed by adsorption onto the ion-exchange fibers through the phenomenon of ion exchange, or by being mechanically trapped by the filter layer, and the suspended solid substances, including sludge, iron oxide, fungi, algae and other undesirable particulate impurities, are removed by the mechanical filtration action of the filter layer, producing a filtrate of high purity. The speed at which the aqueous solution under treatment is passed through the filter layer is generally on the order of 1 to 20 m/hr.

The spent filter layer is separated from the filter support according to the method of this invention by backwashing the filter with gas or water or both. Usually air is used as the gas for this backwashing. After the filter support has been backwashed with air alone or with a mixture of air and water, it is further backwashed with water or other aqueous washing liquid to ensure perfect separation of the spent filter layer. The speed of this backwash is generally about 2 to 6 $m^3/m^2 \cdot hr$ in the case of water, and about 10 to about 30 $m^3/m^2 \cdot hr$ (based on volume at 0° and 1.0 atmospheres) in case of air. The practical service life of the filter layer is determined by the time at which the leakage of impurities into the filtrate has exceeded a predetermined level, or when the pressure drop across the filter layer has reached the level of about 2 $kg/cm^2$. The filter support from which the spent layer has been removed as described above may be used repeatedly with new precoat layers.

Operation of a filter according to the method of the present invention, in which a separate source of compressed air is utilized in stripping the spent filter medium from the filter support, is described with reference to FIG. 6. A multiplicity of filter elements 4 are assembled on a filter-element stand 3 which is welded on to the upper surface of a tube sheet 2 disposed inside a filter tank 1. The filter elements are precoated by first opening the valve $V_5$ fixed in the air vent pipe 13, introducing pure water under pressure via the valve $V_7$ into the filter tank 1, separately adding pure water under pressure via the valve $V_6$ to the precoat tank 7, allowing the precoat system, which includes the filter tank 1, the precoat tank 7 and the precoat pump 8 to fill with water, subsequently closing the valve $V_5$ opening the valves $V_3$ and $V_4$, adding the desired ion exchange fibers, with or without the finely divided ion exchange material to the precoat tank 7 while stirring and blending the contents of tank 7 to intertwine and slurry the ion exchange material, pumping the slurry with the precoat pump 8 via the valve $V_3$ and the inlet pipe 5 into the filter tank 1, where it is evenly distributed by the baffle 9 and is deposited on the outer surfaces of the filter elements 4 while the water entrained by the ion exchange fibers is collected inside the filter elements for and is returned via the outlet pipe 6 and the valve $V_4$ to the precoat tank 7. After a filter layer of uniform thickness has been formed on the outer surfaces of the filter elements 4 as described above, the stirrer 14 and the precoat pump 8 are stopped and the valves $V_3$ and $V_4$ are closed, and the valves $V_1$ and $V_2$ are opened to allow the aqueous solution under treatment to flow through the valve $V_1$, the inlet pipe 5 and the baffle 9 into the filter tank 1. The filtrate passes through the filter elements 4 and out of the filter tank 1 via the outlet pipe 6 and the valve $V_2$. The spent filter layer is separated from the filter elements by closing the valves $V_1$ and $V_2$ and opening the valves $V_5$ and $V_6$ allowing the filter tank 1 to empty of liquid, opening the valves $V_7$ and $V_8$ and introducing a mixture of pressurized, pure water and compressed air via the outlet pipe 6 into the filter tank 1, allowing the mixture of water and air to pass outwardly through the filter elements 4 and allowing the water bearing the stripped filter material to discharge via the inlet pipe 5 and the valve $V_9$.

Operation of a filter according to the method of the present invention, in which no separate source of compressed air is utilized in stripping the elements of the spent filter medium, is described with reference to FIG. 7. A multiplicity of filter elements 4 are assembeled on a filter-element stand 3 which is welded onto the lower surface of a tube sheet 2 disposed inside the filter tank 1. The filter elements are precoated with the ion exchange material by first opening the valve $V_5$ fixed in the air vent pipe 13, introducing pure water under pressure via the valve $V_7$ into the filter tank 1, separately adding pure water under pressure via the valve $V_6$ into the precoat tank 7, allowing the precoat system including the filter tank 1, the precoat tank 7 and the precoat pump 8 to fill with water, subsequently closing the valve $V_5$ and opening the valves $V_3$ and $V_4$, adding the ion exchange fibers with or without finely divided ion exchange material, in a suitable amount to the precoat tank 7 while stirring and blending the contents of the precoat tank to intertwine and slurry the ion exchange material, pumping the resulting slurry by the precoat pump 8 via the valve $V_3$ and the inlet pipe 5 into the filter tank 1, where it is evenly distributed by the distributor 9, and allowing the ion exchange material to deposit on the outer surfaces of the filter elements 4 while the water entrained by the ion change material is collected inside the filter elements for and is returned via the outlet pipe 6 and the valve $V_4$ to the precoat tank 7. After the ion exchange filter has been formed to a uniform thickness on the outer surfaces of the filter elements 4 as described above, the stirrer 14 and the pre-coat 8 are stopped, and the valves $V_3$ and $V_4$ are closed and the valves $V_1$ and $V_2$ are opened to allow the aqueous solution under treatment to flow through the valve $V_1$ the inlet pipe 5 and the distributor 9 into the filter tank 1. The solution passes through the filter elements 4 and is obtained via the outlet pipe 6 and valve $V_2$. The spent filter layer is stripped from the filter elements 4 by closing the valves $V_1$ and $V_2$ and opening the valves $V_5$ and $V_9$, allowing the filter tank 1 to empty of water, then closing the valves $V_5$ and $V_9$ and introducing pure water under pressure via the valve $V_7$, the inlet pipe 5 and the distributor 9 into the filter tank 1, thereby compressing the air held in the tank above the tube sheet 2, subsequently closing the valve $V_7$ and opening the valve $V_9$, which allows the air compressed above the tube sheet 2 to abruptly pass outward through the filter element 4, forcing the separated filter layer from the filter element into the water in the bottom of the filter tank 1. The water containing the spent filter material is then removed via the valve $V_9$.

The following examples are intended to illustrate, but not to limit, the invention except as it is limited in the claims. In each example, a filter support is placed inside a filter cylinder, the ion-exchange fiber slurry is coated onto the support, and a liquid to be treated is passed through the precoat layer and support. The support, cylinder, slurry composition and preparation, and composition of liquid to be treated are described in each example.

EXAMPLE 1

In this example the initial pressure drop and precoat particle leakage of a conventional, powder cation exchange resin precoat layer and a fiber cation exchange precoat layer are compared.

Filter Cylinder: 150 mm ID×2000 mm long, transparent acrylic plastic

Filter Support: 50.8 mm OD×1500 mm long stainless steel gauze, mesh openings 63 $\mu$m, total filter area 0.239 $m^2$.

Finely Divided Resin: Two different resin samples each a styrene-divinylbenzene polymer functionalized with sulfonic acid cation exchange groups in the sodium form and each having a total cation exchange capacity of 4.5 meq/g of dry resin; average diameter of first resin - 51 $\mu$m; of second resin - 96 $\mu$m.

Ion Exchange Fibers: Styrene-divinylbenzene polymer fibers functionalized with sulfonic acid cation exchange groups in the sodium form and having an average thickness of 16 $\mu$m, an average length of 250 $\mu$ and a total cation exchange capacity of 4.2 meq/g of dry fibers.

Separate slurries of each of the finely divided resins and of the fibers were prepared by adding the ion exchange materials over 25-minute period to water in a mixer having stirring vanes 70 mm in diameter and operating at 300 rpm. The slurry concentration is 5% (wt.) solids on a dry basis. This slurry was applied to the support at a rate of 1 kg/$m^2$ of filter area, and at a flow rate of 5 m/hr.

Initial Pressure Drop

After precoating separate filter supports with each of the finely divided resins and with the ion exchange fibers, the pressure drop across these three coated filters and an uncoated filter support were determined using a water flow rate of 10 meters per hour and a temperature of 28° C. The results are shown in Table I below.

TABLE I

| Filter | Size of Ion Exchange Material | Initial Pressure Drop Kg/CM$^2$ |
|---|---|---|
| Bare Support | — | 0.02 |
| Fibers | 16 × 250 μm | 0.05 |
| Conventional | 96 μm diameter | 1.65 |
| Conventional | 51 μm diameter | 2.20 |

The test conducted as described above showed that the initial pressure drop across the fiber precoat layer of the present invention was very small, on the order of 1/70 to 1/50 of the initial pressure drop across conventional precoat layers of finely divided ion exchange resins.

Leakage of Precoat Material

Following determination of the initial pressure drop, the water flow through each of the precoated filters was continued, with samples of the filtrate being taken at the times indicated below and tested for presence of precoat material. The results of this test are shown in Table II below.

TABLE II

| | Precoat Material in Filtrate, μg/Liter of Treated Water | | |
|---|---|---|---|
| | Conventional Filter | | Fiber Filter Of Present Invention |
| Time of Sampling | 51 μm Particles | 96 μm Particles | |
| Immediately after start of treatment | 5.9 | 4.3 | 0.3 |
| After 5 hrs treatment | 0.8 | 0.6 | 0.1 |
| After 24 hrs treatment | 0.2 | 0.2 | 0.0 |

The test conducted as described above showed that even the larger diameter conventional precoat material leaked significantly into the filtrate, and leakage continued even after 24 hours of treatment. In contrast, the initial leakage of the fiber precoat material prepared according to the present invention was initially small, fell to 0.1/μg liter after five hours, and was undetectable after 24 hours. Treatment of the water with the conventional precoat materials was difficult because of the high pressure drop, but the water being treated passed easily through the precoat materials of the present invention.

EXAMPLE 2

In this example the breakthrough capacities of three conventional, finely divided anion exchange resin precoat layers were compared with that of a fiber anion exchange precoat layer containing finely divided cation exchange resin prepared according to the present invention.

Filter Cylinder and Support: As in Example 1.
Finely Divided Resins: Three different resin samples, each a styrene divinylbenzene polymer functionalized with trimethylammouium anion exchange groups in the hydroxyl form, and each having a total anion exchange capacity of 4.1 meq/g of dry resin; average diameter of first resin-39 μm; of second resin-4-8 μm; of third resin-61 μm. Designated as $R_A$
Ion Exchange Fibers: Styrene-divinylbenzene polymer fibers functionalized with trimethylammonium amion exchange groups in the hydroxyl form and having an average thickness of 26 μm, an average length of 200 μm and a total anion exchange capacity of 3.8 meq/g of dry fibers. Designated as $F_A$.
Finely Divided Resin Used as Additive: Styrene-divinylbenzene polymer functionalized with sulfonic acid cation exchange groups in the hydrogen form having an average particle diameter of 45 μm and a total cation exchange capacity of 5.0 meq/g. Designated as $R_C$.

The finely divided cation exchange resin, $R_c$, identified above, was added to the conventional precoat materials and to the fiber precoat materials of the present invention to allow determination of the breakthrough point of the anion exchange resin by electrical conductivity. To ensure that the anion exchangers tested would never fail to reach the breakthrough point as a result of cation exchanger inadequacy, the cation exchanger was added to each precoat mixture in amounts twice those of the anion exchangers used.

The conventional precoat composition were $R_A:R_c=1.2$ (by weight on a dry basis), and the precoat composition according to the present invention was $F_A:R_C=1:2$; each precoat was applied at a rate of 1 kg/m$^2$ of filter surface, or 239 μg of precoat on the filter. The conditions for mixing and blending the precoat material, slurry concentration, mixer speed and other conditions were the same as those used in Example 1. After the precoat layers were applied, a 1-ppm (as $CaCO_3$) aqueous sodium chloride solution was passed through the filters at a rate of 10 m/hr. The breakthrough capacity in meq/g dry anion exchanger, was determined by determining the point at which the electrical conductivity of the aqueous solution reached 0.1 μmho/cm at 25° C. The results of this test are shown in Table III.

TABLE III

| Filter | Size of Anion Exchange Material | Initial Conductivity at 25° C. | Breakthrough Capacity |
|---|---|---|---|
| Conventional | 39 μm | 0.06–0.07 μmho/cm | 1.9 meq/g |
| Conventional | 48 μm | 0.08–0.09 | 1.4 |
| Conventional | 61 μm | 0.17 | 0 |
| Present Invention | 26 × 300 μm | 0.06–0.07 | 2.0 |

From these results it may be seen that the precoat filter of the present invention shows a higher breakthrough capacity than the conventional precoat filters.

EXAMPLE 3

In this example synthetic solutions representing condensate and blow water for PWR-type clear power stations were treated according to the process of the present invention.

Filter Cylinder: 150 mm ID×1000 mm long, Stainless steel.
Filter Support: 50 mm OD×250 mm long stainless steel gauze, mesh openings 63 μm, total filter area 0.039 m$^2$.

(A) Condensate Treatment

Synthetic condensate water: 15 μg/l iron oxide (as Fe), 1430 μg/l $NH_4^+$ and 0.14 μg/l $Na^+$.
Ion Exchange Fibers: Styrene-divinylbenzene polymer fibers functionalized with sulfonic acid cation exchange groups in the ammonium ion form and having an average thickness of 16 μm, an average length of 250

μm and a total cation exchange capacity of 4.2 meq/g of dry fiber.

The precoat slurry was prepared and coated onto the filter support as described in Example 1. Subsequent to application of the precoat layer, the synthetic condensate water was passed through the filter layer at a rate of 10 m/hr (0.39 m³/hr.) until the pressure drop across the filter reached 1.75 kg/cm². The results of this test are shown in Table IV.

TABLE IV

| Treatment Period-Days | Total Condensate Treated- Cubic Meters | Pressure Drop - Kg/cm² | Filtrate/Analysis Iron ($\mu$gFe/L) | Sodium ($\mu$gNa$^+$/L) |
|---|---|---|---|---|
| 5  | 47  | 0.20 | 4 | 0.025 |
| 10 | 94  | 0.42 | 4 | 0.025 |
| 15 | 140 | 0.65 | 3 | 0.025 |
| 20 | 187 | 0.87 | 3 | 0.025 |
| 25 | 234 | 1.15 | 2 | 0.030 |
| 30 | 281 | 1.40 | 4 | 0.030 |
| 35 | 328 | 1.62 | 3 | 0.030 |

From Table IV it may be seen that continuous treatment of condensate water for 35 days is practical according to the present invention, and produces high quality filtrate substantially reduced in iron and sodium. During treatment the surface of the filter layer was uncracked. When a conventional precoat layer was formed using a finely divided cation exchange resin in the ammonium ion form having an average particle diameter of 51 μm, the initial pressure drop was greater than the end point of 1.75 kg/cm², so treatment was not attempted.

(B) Steam Generator Blow Water Treatment

Synthetic Blow Water: 105 μg/l iron oxide (as Fe).
Ion Exchange Fibers: Styrene-divinylbenzene polymer fibers functionalized with sulfonic acid cation exchange groups in the sodium ion form and having an average thickness of 28 μm, an average length of 200 μm and a total cation exchange capacity of 0.2 meq/g of dry fibers.

The precoat slurry was prepared and coated onto the filter support as described in Example 1. Subsequent to application of the precoat layer, the synthetic blow water for the steam generator was passed through the filter layer at a rate of 8 m/hr (0.31 m³/hr) until the pressure drop across the filter reached 1.8 kg/cm². The results of this test are shown in Table V.

TABLE V

| Treatment Period-Days | Total Water Treated- Cubic Meters | Pressure Drop-Kg/cm² | Filtrate Iron Analysis $\mu$g Fe/l |
|---|---|---|---|
| 5  | 37  | 0.37 | 6 |
| 10 | 75  | 0.73 | 5 |
| 15 | 112 | 1.09 | 6 |
| 20 | 150 | 1.45 | 6 |
| 25 | 187 | 1.77 | 7 |

From Table V it may be seen that continuous treatment of steam-generator blow water for 25 days is practical according to the present invention, and produces large volumes of high-quality filtrate with very low iron content, indicating that the treatment removes large quantities of the iron oxide in the water. During treatment the surface of the filter layer remained uncracked. A conventional precoat layer of a finely divided cation exchange resin in the sodium ion form with average particle diameter of 51 μm was prepared on the support, but when treatment of the blow water was attempted the initial pressure drop was greater than the end point of 1.9 kg/cm², so further treatment was not attempted.

EXAMPLE 4

In this example a synthetic solution representing condensate water for BWR-type nuclear power stations was treated according to the process of the present invention.

Filter Support: As in Example 1.
Synthetic Condensate Water: pH = 7; iron oxide content = 35 μg/l Fe; electrical conductivity = 0.15–0.20 μmho/cm at 25° C.
Ion Exchange Fibers: Styrene-divinylbenzene polymer fibers functionalized with sulfonic acid cation exchange groups in the hydrogen form and having an average thickness of 23 m, an average length of 320 m and a total cation exchange capacity of 4.6 meq/g of dry fiber.

The precoat slurry was prepared and coated onto the filter support as described in Example 1. Subsequent to application of the precoat layer, the synthetic condensate water was passed through the filter layer at a rate of 10 m/hr (2.39 m³/hr) until the pressure drop across the filter reached 1.75 kg/cm². The results of this test are shown in Table VI.

TABLE VI

| Treatment Period-Days | Total Condensate Treated- Cubic Meters | Pressure Drop-kg/cm² | Filtrate Analysis Iron, $\mu$g Fe/l |
|---|---|---|---|
| 5  | 287  | 0.32 | 4 |
| 10 | 574  | 0.63 | 3 |
| 15 | 860  | 0.94 | 3 |
| 20 | 1147 | 1.25 | 2 |
| 25 | 1434 | 1.50 | 3 |
| 30 | 1721 | 1.73 | 4 |

From Table VI it may be seen that continuous treatment of condensate water for 30 days is practical according to the present invention, and produces high quality filtrate substantially reduced in iron concentration. A conventional precoat layer of finely divided cation exchange resin in the hydrogen ion form with average particle diameter of 45 m was prepared on the support, but when treatment of condensate water was attempted the initial pressure drop was greater than the end point of 1.75 kg/cm², so further treatment was not attempted.

Subsequent to treatment of the condensate water using the process of the present invention, the spent precoat layer was separated from the support under the following conditions:

First Backwash—Air at 20 m³/m².hr (based on volume at 0° C. and 1.0 atmosphere. for 1 minute.
Second Backwash—Water at 4 m³/m².hr for 1 minute.

One cycle of air backwash and water backwash was sufficient to separate the spent precoat layer easily from the support. The backwashing produces a potentially radioactive slurry of spent precoat material and water having the very modest volume of 110 liters, which represents only about 0.006% of the total volume of filtrate produced. Separation of the conventional precoat layer of finely divided ion exchange resin from its support required two cycles of air backwash and water backwash, and produced 200 liters of the potentially radioactive slurry of spent precoat material and water, or about twice as much as the method of the present invention.

EXAMPLE 5

In this example the leakage of filter material into the filtrate is determined for filter precoat layers of mixed cation and anion finely divided resin, and mixed cation and anion fibers.

Filter Cylinder and Filter Support: As in Example 1

Finely Divided Resins: Styrene-divinylbenzene polymer resins functionalized with sulfonic acid cation exchange groups in the hydrogen ion form and having an average diameter of 45 μm and a total cation exchange capacity of 5.0 meq/g of dry resin ($R_c$), and functionalized with trimethylammonium anion exchange groups in the hydroxyl ion form and having an average diameter of 39 μm and a total anion exchange capacity of 4.1 meq/g of dry resin ($R_A$).

Ion Exchange Fibers: Styrene-divinylbenzene polymer fibers functionalized with sulfonic acid cation exchange groups in the hydrogen ion form and having an average thickness of 23 μm, an average length of 220 μm and a total cation exchange capacity of 4.6 meq/g of dry fibers (Fc), and functionalized with trimethylammonium anion-exchange groups in the hydroxyl ion form and having an average thickness of 20 μm, and average length of 200 μm and a total anion-exchange capacity of 3.8 meq/g of dry fibers.

The slurries and precoat layers were prepared according to the conditions set forth in Example 1. The weight ratio of $R_C:F_A=2:1$, and the total weight of ion exchange material in each slurry was 239 g.

After the precoat layer was applied, pure water was passed through the filter at a rate of 8 m/hr., and the filtrate was sampled at the indicated intervals and tested for contant of ion exchange material. The results of this test are shown in Table VII.

TABLE VII

| | Leakage of Precoat Material into Filtrate | |
|---|---|---|
| Time of Sampling | Conventional Method ($R_C + R_A$) | Method of Present Invention ($F_C + F_A$) |
| After 0 hr. | 6.5 g/liter | 0.3 g/liter |
| After 5 hr. | 0.9 | 0.1 |
| After 24 hr. | 0.2 | 0.0 |

From the results of this test is may be seen that the conventional precoat filter of finely divided resin leaks a considerable amount of precoat material into the filtrate, and leakage continues even after 24 hours of treatment, while the precoat filter of the present invention leaks only 0.1 g of precoat material per liter of filtrate after 5 hours, and leakage is undetectable after 24 hours.

In this example the breakthrough capacities and filtrate purities are compared for filter precoat layers of mixed cation and anion finely divided resin, and mixed cation and anion fibers.

The apparatus, precoating materials and precoat layers were as described in Example 5. After the precoat layer, had been formed, a 1-ppm (by weight as $CaCO_3$) aqueous solution of sodium chloride was passed through the filters at a rate of 8 m/hr. The electrical conductivities of the filtrates were determined after passage of solution containing the indicated quantities of sodium chloride; results of this test are shown in Table VIII.

TABLE VIII

| Total Salt Content of Solution Treated meq/g of anion resin | Electrical Conductivity of Filtrate | |
|---|---|---|
| | Conv. Method ($R_C + R_A$) | Method of Present Invention ($R_C + F_A$) |
| 0.4 meq/g dry resin | 0.07 μmho/cm at 25° C. | 0.07 μmho/cm at 25° C. |
| 0.8 | 0.07 | 0.07 |
| 1.2 | 0.07 | 0.07 |
| 1.6 | 0.08 | 0.07 |
| 2.0 | 0.09 | 0.08 |
| 2.4 | 0.11 | 0.09 |
| 3.2 | — | 0.11 |

Breakthrough was taken at the point at which the electrical conductivity exceeded 0.10 μmho/cm (at 25° C.). As may be seen from the above results, the capacity of the filter operated according to the method of the present invention was slightly greater than that of the conventional filter. It should be noted that, because of the formation of cracks in the conventional precoat filter, the determination for that filter had to be repeated. The filter operated according to the method of the present invention remained intact throughout the treatment.

EXAMPLE 7

In this example the effectiveness of precoat filters of mixed cation and anion exchange fibers according to the present invention, and of conventional filters of finely divided, mixed cation and anion exchange resins, were determined for treatment of power-plant steam condensate water containing suspended and colloidal iron oxides.

Filter Cylinder: 150 mm ID × 2000 mm long, stainless steel, fitted with a hard glass inspection window.

Filter Support: As in Example 1

The precoating materials and precoat layers were as described in Example 5. The steam condensate water possessed the following properties:

Electrical Conductivity: 0.15 to 0.20 μmhos/cm at 25° C.

Particle Diameter of Suspended Solid Substances: 0.45 to 8 nanometers

Iron Content: 30 to 35 μg (as Fe)/liter (suspended and colloidal iron preponderantly as iron oxide).

This steam condensate water was passed through the filters at a rate of 0.02 kg/cm² until the pressure drop exceeded 1.80 kg/cm²; the results of this test are shown in Table IX below.

TABLE IX

| Treatment Time (Days) | Total Filtrate Volume (m³) | Conventional Precoat Filter | | Precoat Filter of Present Invention | |
|---|---|---|---|---|---|
| | | Iron in Filtrate (μg/liter) | Pressure Drop (kg/cm²) | Iron in Filtrate (μg/liter) | Pressure Drop (kg/cm²) |
| 1 | 57 | 8 | 0.03 | 4 | 0.03 |
| 5 | 287 | 8 | 0.40 | 3 | 0.26 |
| 10 | 547 | 7 | 0.90 | 3 | 0.53 |
| 15 | 860 | 7 | 1.37 | 2 | 0.79 |
| 20 | 1147 | 7 | 1.83 | 3 | 1.06 |
| 25 | 1434 | 7 | 2.14 | 2 | 1.34 |
| 30 | 1721 | — | — | 2 | 1.50 |
| 35 | 2008 | — | — | 2 | 1.66 |

TABLE IX-continued

| Treatment Time (Days) | Total Filtrate Volume ($m^3$) | Conventional Precoat Filter | | Precoat Filter of Present Invention | |
|---|---|---|---|---|---|
| | | Iron in Filtrate ($\mu g$/liter) | Pressure Drop ($kg/cm^2$) | Iron in Filtrate ($\mu g$/liter) | Pressure Drop ($kg/cm^2$) |
| 40 | 2294 | — | — | 2 | 1.81 |

As may be seen from the above results, the iron in the steam condensate water was removed more efficiently, the pressure drop was smaller, and the total volume of water treated before the shutoff pressure of 1.80 $kg/cm^2$ was exceeded and was almost twice as great for the precoat filter prepared according to the method of the present invention, compared to the conventional precoat filter.

EXAMPLE 8

In this example the leakage of filter precoat material into treated filrate was compared for a conventional, mixed precoat layer of finely divided cation and anion exchange resins, and for a precoat layer prepared according to the method of the present invention, and containing cation and anion exchange fibers and finely divided cation exchange resins.

Filter Cylinder Support: As in Example 1

The finely divided resins, $R_C$ and $R_A$, and the ion exchange fibers, $F_c$ and $F_A$, were as described in Example 5. The preparation of the filter precoat layer was as described in Example 1, and the precoat material were mixed in the following ratios:

$R_C:R_A=2:1$
$F_C:F_A:R_C=1:1:1$

The total weight of mixed finely divided resins, and the total weight of mixed ion exchange fibers and finely divided cation exchange resin, was 239 g.

After the precoat layers were applied, pure water was passed through the filters at a flow rate of 8 m/hr; the filtrate was sampled at the indicated time and tested for leakage of the precoat material into the filtrate. The results are shown in Table X below.

TABLE X

| | Precoat Material in Filtrate $\mu g$/liter of treated water | |
|---|---|---|
| Time of Sampling | Conventional Filter | Fiber Filter of Present Invention |
| Immediately after start of treat. | 6.5 | 0.8 |
| After 5 hrs treatment | 0.9 | 0.1 |
| After 24 hrs treatment | 0.2 | 0.0 |

As may be seen from the above results, the conventional filter allowed a considerable amount of percoat material to leak into the filtrate, and leakage still continued after 24 hrs. of water treatment, whereas the fiber precoat containing finely divided cation-exchange resin, prepared according to the method of the present invention, allowed leakage of the filter material at the rate of only 0.1 $\mu g$/liter after 5 hrs. of treatment, and passed no detectable filter material after 24 hrs. of treatment.

EXAMPLE 9

In this example cation and anion exchange fibers and finely divided cation and anion exchange resins were mixed and formed into a precoat filter according to the process of the present invention; this filter was used to treat power-station condensate water for removal of suspended and colloidal iron.

Filter Cylinder Support: As in Example 7.

The precoating materials were as described in Example 8, except that the precoat slurry of fibers and finely divided resin contained the anion exchange materials in the following ratio:

$F_C:F_A:R_C:R_A=2:1:1:0.5$

All other conditions for preparation of the filters including the conventional filter, were the same as those used in Example 8. The power-station condensate water was the same water, possessing the same properties, as that of Example 7. After the precoat filters were formed, the condensate water was passed through the filters at a flow rate of 10 m/hr until the pressure drop across the filter exceeded 1.80 $kg/cm^2$; the initial pressure drop across the filters was 0.02 $kg/cm^2$/ The results of this test are shown in Table XI.

TABLE XI

| Treatment Time (Days) | Total Filtrate Volume ($m^3$) | Conventional Precoat Filter | | Precoat Filter of present Invention | |
|---|---|---|---|---|---|
| | | Iron in Filtrate ($\mu g$/liter) | Pressure Drop ($kg/cm^2$) | Iron in Filtrate ($\mu g$/liter) | Pressure Drop ($kg/cm^2$) |
| 1 | 57 | 8 | 0.03 | 5 | 0.03 |
| 5 | 287 | 8 | 0.40 | 4 | 0.30 |
| 10 | 574 | 7 | 0.90 | 4 | 0.63 |
| 15 | 860 | 7 | 1.37 | 3 | 0.95 |
| 20 | 1147 | 7 | 1.83 | 4 | 1.27 |
| 25 | 1434 | 7 | 2.14 | 3 | 1.57 |
| 30 | 1721 | — | — | 3 | 1.75 |
| 35 | 2008 | — | — | 3 | 1.94 |

As may be seen from the above results, the precoat of the present invention, containing mixed cation and anion exchange fibers, and finely divided mixed cation and anion exchange resins, more effectively removed the colloidal and suspended iron from the condensate water, and showed a lower pressure drop across the filter than was observed with the conventional filter. The amount of liquid treated before the pressure exceeded the cutoff point of 1.80 $kg/cm^2$ was about half the volume using the conventional filter than it was using the filter prepared according to the present invention.

EXAMPLE 10

This example repeats Example 1, except that the filter precoat slurry used in the method of the present invention contained both the ion exchange fibers and the finely divided cation-exchange resin having an average particle contained both the ion exchange fibers and the finely divided cation-exchange resin having an average particle diameter of 51 $\mu m$; the fibers and cation-exchange resin were mixed in a ratio of 1:1. The tests for initial pressure drop and for precoat material leakage into the filtrate were repreated as described in Example 1, with the results being shown in Tables XII and XIII; these results are analogous to those in Tables I and II.

TABLE XII

| Filter | Size of Ion Exchange Material | Initial Pressure Drop ($kg/cm^2$) |
|---|---|---|
| Fiber + Powder | 16 × 250 m + 51 m dia. | 0.28 |
| Conventional | 51 m diameter | 2.20 |

TABLE XII-continued

| Filter | Size of Ion Exchange Material | Initial Pressure Drop (kg/cm²) |
|---|---|---|
| Conventional | 96 m diameter | 1.65 |

TABLE XIII

| | Precoat Material in Filtrate (μg/Liter of Treated Water) | | |
|---|---|---|---|
| Time of Sampling | Conventional 51 m Particles | Filters 96 m Particles | Fiber + Powder Filter of Present Invention |
| Imm. after start of treatment | 5.9 | 4.3 | 1.3 |
| After 5 hrs. treatment | 0.8 | 0.6 | 0.3 |
| After 24 hrs. treatment | 0.2 | 0.2 | 0.0 |

As may be seen from the above results, even the conventional filter with the larger particle leaked a considerable amount of the filter material into the filtrate, and leakage still continued after 24 hours of treatment. Because of the large pressure drop, forcing water through the conventional filter was in itself extremely difficult. In contrast, the mixed fiber and finely divided resin filter of the present invention produced little leakage of ion exchange material into the filtrate, and this leakage had fallen to an undetectable level within 24 hours. The filtration was facilitated by the low pressure drop across the filter of the present invention.

EXAMPLE 11

The apparatus methods of filter layer preparation, condensate water treated, and other details of materials, methods and conditions of this example are the same as those of Example 3, the only difference being that the filter layer of the present invention was prepared using the same blend of cation exchange fibers and finely divided cation-exchange resin as Example 10. The taken as the end point for the treatment was 1.80 kg/cm², instead of 1.75 kg/cm² as in Example 3. The results of the treatment of the condensate water (Test A) as shown in Table XIV.

| Treatment Period-Day | Total Condensate Treat.-m³ | Pressure Drop-kg/cm² | Filtrate Analysis | |
|---|---|---|---|---|
| | | | Iron (μg Fe/l) | Sodium (μg Na⁺/l) |
| 5 | 47 | 0.5 | 6 | 0.03 |
| 10 | 94 | 0.8 | 6 | 0.03 |
| 15 | 140 | 1.1 | 4 | 0.03 |
| 20 | 187 | 1.3 | 4 | 0.03 |
| 25 | 234 | 1.7 | 3 | 0.04 |
| 30 | 281 | 2.0 | 4 | 0.04 |

The results of the steam-generator blow water treatment (Test B) was conducted using the same filter layer of the present invention as described above in this example; all other conditions were as described in Example 3. The results of this test are shown in Table XV.

TABLE XV

| Treatment Period-Days | Total Blow Water Treated m³ | Pressure Drop-kg/cm² | Filtrate Iron Analysis-μg Fe/l |
|---|---|---|---|
| 5 | 37 | 0.7 | 8 |
| 10 | 75 | 1.2 | 7 |
| 15 | 112 | 1.6 | 8 |
| 20 | 150 | 2.0 | 8 |

As may be seen from the above results, the filter precoat layers prepared according to the method of the present invention effectively reduce the concentration of both suspended, colloidal, and ionic impurities in the treated liquids, and may be used for extended periods of time without developing undue pressure drop. The difficulties with using conventional filter precoat layers in these two tests are discussed in Example 3.

EXAMPLE 12

This example repeats Example 4 except that different ion exchange material were used in preparing the filter precoat layers. The ion exchange materials, $R_C$, $R_A$ and $F_C$, were as described in Example 5. The conventional precoat layer was prepared from finely divided materials mixed in the ratio of $R_C:R_A=2:1$, and two different filter layers were prepared according to the method of the present invention, the first containing the ion exchange materials in the ratio of $F_C:R_A=2:1$, and the second in the ratio of $F_C:R_C:R_A:1:1$, by weight on a dry basis. The pressure drop taken as the end point for this test was 1.80 kg/cm². The results of this test were as shown in Table XVI below.

TABLE XVI

| | | Conventional Filter ($R_C R_A$) | | Filters of Present Invention | | | |
|---|---|---|---|---|---|---|---|
| | | | | $F_C + R_A$ | | $F_C + R_C + R_A$ | |
| Treatment Period-Days | Volume of Water Treated (m³) | Iron Content (μg Fe/l) | Press. Drop | Iron Content | Press. Drop (kg/cm²) | Iron Content | Press. Drop (kg/cm²) |
| 1 | 57 | 8 | 0.03 | 6 | 0.03 | 5 | 0.03 |
| 5 | 287 | 8 | 0.40 | 6 | 0.32 | 4 | 0.32 |
| 10 | 574 | 7 | 0.90 | 5 | 0.68 | 4 | 0.69 |
| 15 | 860 | 7 | 1.37 | 5 | 1.02 | 3 | 1.04 |
| 20 | 1147 | 7 | 1.83 | 5 | 1.37 | 4 | 1.39 |
| 25 | 1434 | 7 | 2.14 | 5 | 1.67 | 3 | 1.70 |
| 30 | 1721 | — | — | 5 | 1.94 | 3 | 1.98 |

As may be seen from the above filter precoat layers prepared according to the method of the present invention effectively remove both suspended and colloidal materials from treated liquids for an extended period of time, the amount of water treated before the end-point pressure drop was exceeded being almost twice as much for these filters as for the conventional. Similar results to those of Example 4 were obtained during the backwash described in that example, and the additional discussion in that example applies equally well to the present example.

We claim:

1. A filter for simultaneous filtration and ion exchange of aqueous solutions comprising a filter support and removably disposed thereon a filter precoat layer comprising intertwined ion exchange fibers having a thickness from about 2 to about 200 micrometers and a length at least twice their thickness.

2. The filter according to claim 1 wherein the ion exchange fibers are cation exchange fibers.

3. The filter according to claim 1 wherein the ion exchange fibers are anion exchange fibers.

4. The filter according to claim 1 wherein the ion exchange fibers are mixed cation and anion exchange fibers.

5. The filter according to claim 1 wherein the filter precoat layer additionally contains finely divided ion exchange resin particles having a diameter from about 2 to about 250 micrometers, the finely divided resin particles being entrained within the interstices between the intertwined ion exchange fibers.

6. The filter according to claim 5 wherein the finely divided ion exchange resin particles are cation exchange resin particles.

7. The filter according to claim 5 wherein the finely divided ion exchange resin particles are anion exchange resin particles.

8. The filter according to claim 5 wherein the finely divided ion exchange resin particles are mixed cation and anion exchange resin particles.

9. A process for simultaneously removing ionic impurities and suspended particulate impurities from an aqueous solution containing said impurities which comprises the consecutive steps of:
 (a) mixing ion exchange fibers having a thickness from about 2 to about 200 micrometers and a length of more than twice their thickness, to intertwine the fibers into a compact mass,
 (b) converting the compact mass of fibers into a slurry with water and applying the slurry to a filter support, to form a precoat layer thereon, and
 (c) passing the aqueous solution containing the impurities through the precoat layer to remove the impurities.

10. The process according to claim 9 wherein, subsequent to removal of impurities from the aqueous liquid, the filter support is backwashed with a gas, liquid, or mixed gas and liquid, to remove the precoat layer containing the removed impurities.

11. The process according to claim 10 wherein the ion exchange fibers are cation exchange fibers.

12. The process according to claim 10 wherein the ion exchange fibers are anion exchange fibers.

13. The process according to claim 10 wherein the ion exchange fibers are mixed cation and anion exchange fibers.

14. The process according to claim 10 wherein the ion exchange fibers are mixed with finely divided ion exchange resin particles having a diameter from 2 to about 250 micrometers to intertwine the fibers and entrain the finely divided particles within the interstices between the intertwined fibers, and wherein the resulting compact mass of fibers and finely divided particles is converted into a slurry with water and is applied to the filter support to form the precoat layer thereon.

15. The process according to claim 14 wherein the finely divided particles are cation exchange particles.

16. The process according to claim 14 wherein the finely divided particles are anion exchange particles.

17. The process according to claim 14 wherein the finely divided particles are mixed anion and cation exchange particles.

* * * * *